United States Patent

[11] 3,632,330

[72] Inventor: Joseph B. Michaelson, North Hollywood, Calif.
[21] Appl. No.: 14,837
[22] Filed: Apr. 20, 1970
[45] Patented: Jan. 4, 1972
[73] Assignee: The Applied Biological Sciences Laboratory, Inc., Glendale, Calif.
Original application Aug. 9, 1967, Ser. No. 659,321. Divided and this application Apr. 20, 1970, Ser. No. 14,837

[54] COMBATTING ALGAE, BACTERIA AND FUNGI WITH NITROSO ARYLOXY QUATERNARY AMMONIUM COMPOUNDS
6 Claims, No Drawings

[52] U.S. Cl. .................................... 71/67, 71/88, 71/92, 71/94, 71/95, 71/121, 210/64, 252/8.55 D, 252/82, 252/106, 252/392, 260/247.7 C, 260/286 Q, 260/294.7 M, 260/297.5, 260/309.7, 260/326.5 M, 260/561.5, 424/248, 424/258, 424/263, 424/267, 424/273, 424/274, 424/329
[51] Int. Cl. ..................................... A01n 9/00, A01n 11/00, A01n 23/00
[50] Field of Search ............................... 424/248, 273, 274, 258, 263, 267, 329; 71/67, 88, 92, 94, 95, 121; 252/8.55 O, 82, 106, 392; 260/247.7 C, 286 Q, 294.7 M, 297.5, 309.7, 326.5 M, 567.5; 210/64

[56] References Cited

UNITED STATES PATENTS

| | | | |
|---|---|---|---|
| 2,383,775 | 8/1945 | Craig et al. .................. | 260/567.5 X |
| 2,821,488 | 1/1958 | Jezl ............................... | 260/567.5 X |
| 3,111,492 | 11/1963 | Steinberger .................. | 252/8.55 |
| 3,158,647 | 11/1964 | Myers............................ | 260/567.5 X |
| 3,417,184 | 12/1968 | Wakeman et al............. | 424/258 |
| 3,419,562 | 12/1968 | Wakeman et al............. | 260/286 Q |
| 3,551,334 | 12/1970 | Michaelson .................. | 252/8.55 |

*Primary Examiner*—Shep K. Rose
*Attorney*—White & Haefliger

ABSTRACT: Nitroso aryloxy quaternary ammonium compounds, such as tetra alkyl ammonium nitrosophenate, are new compositions of matter in which the presence of the nitroso substituent, which is oxidizable to $NO_2$ or reducible to $NH_2$ in appropriate media, enhances the known effectiveness of the component ammonium radicals in bactericidal, fungicidal, antiseptic and other biologically prophylatic roles and confers on the compound other beneficial properties such as rust inhibition. The invention further contemplates method for the in situ generation of amino and nitrite substituted quaternary ammonium compounds in liquid media.

COMBATTING ALGAE, BACTERIA AND FUNGI WITH NITROSO ARYLOXY QUATERNARY AMMONIUM COMPOUNDS

REFERENCE TO RELATED APPLICATION

This application is a division of application Ser. No. 659,321 filed Aug. 9, 1967.

BACKGROUND OF THE INVENTION

1. Field of the Invention

This invention relates generally to new compositions of matter and particularly to such compositions which contain a quaternary ammonium moiety. The new compositions have been found to be surprisingly effective in biocidal applications including use as fungicides, bactericides and alimicides and in other applications where control of micro-organisms, directly or through modification of their environment, is desired. Such applications will include, particularly, amelioration of raw sewage by selective destruction of noxious vapor-generating organisms such as the desulfovibrio desulfuricans. The invention is particularly concerned with improved performance of known ammonium radicals through the simultaneous control of the oxidative or reductive condition of the medium in which the radical is to operate. In certain embodiments, the present compounds afford simultaneous control of microbiological and oxidative phenomena e.g., by destroying microbes and inhibiting rust simultaneously in applications demanding such joint benefits, for example secondary oil recovery operations.

The invention further is concerned with methods for the in situ generation of $NH_2$ and $NO_2$ substituents in aryloxy quaternary ammonium compound solutions and resultant control of the oxidative or reductive state of such solutions.

2. Description of the Prior Art

Quaternary ammonium compounds are well known. Hereinafter there appears a listing of typical patents in this area. The biologic properties of quaternary ammonium compounds are similarly well known, as a perusal of the hereinafter named patents will reveal. To my knowledge, however, a nitrosoaryloxy moiety has not previously been combined with a quaternary ammonium moiety to form an ionically bonded compound. Nor has it been recognized heretofore that such combination provides a means of closely controlling the oxidative or reductive state of an ammonium containing solution made therefrom to thus enable maximum biological activity from the ammonium radical.

SUMMARY OF THE INVENTION

There have been discovered compounds having the formula

Q—O—Ar—NO in which Q is a quaternary ammonium moiety and Ar is an aryl group. These compounds have been found to exhibit the bactericidal, fungicidal and antiseptic qualities of the ammonium moiety to an increased degree, and to have the property of lessening the reducing or oxidizing propensities of the medium in which the compound is dissolved, thus to increase the biocidal effectiveness of the ammonium moiety.

A typical preparation of these new compounds is carried out as follows: To 1 molar part of dodecyldimethyl amine dissolved in methyl alcohol there is added 1 molar part of benzyl chloride and the mixture is refluxed for 24 hours. The resultant dodecyl dimethyl benzyl ammonium chloride is mixed with an alcoholic solution containing 1 molar part sodium metal and 1 molar part phenol and the mixture heated to 50°C. for 15 minutes. Following cooling to room temperature and filtering off of precipitated sodium chloride the filtrate, an alcoholic solution of dodecyl dimethyl benzyl ammonium phenoxide is saturated with nitrous oxide gas and let stand for 24 hours. A waxy solid is obtained on evaporative removal of the alcohol. All parts by weight in the above.

DESCRIPTION OF THE PREFERRED EMBODIMENTS

The quaternary ammonium moiety Q herein may be represented as having the structure

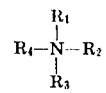

in which $R_1$, $R_2$, and $R_3$ are each selected from the group consisting of alkyl, cycloalkyl, haloalkyl, alkoxy, aryl, haloaryl, aryloxy, alkenyl, alkaryl, aminoalkyl, and hydroxyalkyl radicals, particularly having no more than 10 and especially up to seven carbon atoms inclusive and $R_4$ is selected from the foregoing or is an aliphatic radical, preferably saturated, and having 12 to 18 or more up to 22 carbon atoms inclusive. $R_1$, $R_2$ and $R_3$ may be the same or different and may be identical or joined together so as to form a heterocyclic ring with the N atom, e.g., as in pyrrolidinium, piperdinium, pyrrolium, imidazolinium, pynidinium, quinolinium, including isoquinolinium and quinaldinium, picolinium and morpholinium groups, all of which are herein termed "ammonium" moieties and are included in the symbol Q along with the quaternary ammonium group per se, $N-R_{1-4}^+$, in which N is not in a ring.

The bond between the Q moiety and the remainder of the compound is ionic in nature.

Typical ammonium groups, Q in the formula above, include, among the nonheterocyclics:

The alkyl quaternary ammoniums such as lauryl trimethyl, stearyl trimethyl, stearyl dimethyl ethyl, cetyl dimethyl ethyl, myristal dimethyl ethyl, lauryl dimethyl ethyl, tallow trimethyl, hydrogenated tallow trimethyl, coco trimethyl, di-hydrogenated tallow dimethyl, di-coco dimethyl, di-soya dimethyl, tallow dimethyl ethyl and soya dimethyl ethyl ammoniums: and the alkyl aryl quaternary ammoniums such as lauryl dimethyl benzyl, alkyl dimethyl benzyl, cetyl dimethyl benzyl, steryl dimethyl benzyl, alkyl dimethyl dichlorobenzyl, alkyl dimethyl ethylbenzyl, alkyl dimethyl benzyl, dodecyl benzyl trimethyl, dodecylmethylbenzyl trimethyl, octylphenoxy ethoxyethyl dimethylbenzyl, soya dimethyl benzyl, hydrogenated tallow dimethyl benzyl, tallow dimethyl benzyl and cetyl dimethyl benzyl ammoniums;

Among the heterocyclic ammonium groups there may be mentioned those having alkyl, aryl, alkaryl, alkenyl, hydroxyalkyl, chloroaryl and chloralkyl substituents such as coco, lauryl, dodecyl, cetyl, and stearyl pynidiniums, morpholiniums, quinoliniums, piperidiniums, pyrroliniums, pyrrolidiniums and α, β or γ picoliniums, and allyl benzyl hydroxyethyl, allyl dichlorobenzyl hydroxyethyl, pentyl ethylbenzyl hydroxyethyl, coco benzyl hydroxyethyl, coco ethyl hydroxyethyl, stearyl ethyl benzyl, stearyl benzyl hydroxyethyl, stearyl dichlorobenzyl hydroxyethyl and stearyl ethyl benzyl hydroxyethyl imidozoliniums, as well as coco methyl and myristal methyl morpholinium and N-(stearoyl (or lauroyl) colamino formyl methyl)-pyridiniums.

In addition to these foregoing groups, other ammonium groups useful in the formation of the present compounds may be found in one or more of the following patents, which are hereby incorporated by reference:

U.S. Pat. No. 2,302,697 to Katzman
U.S. Pat. No. 2,317,999 to Leuchs
U.S. Pat. No. 2,383,775 to Craig, et al.
U.S. Pat. No. 2,395,989 to Bock, et al.
U.S. Pat No. 2,519,924 to Nowak
U.S. Pat. No. 2,733,206 to Prusick
U.S. Pat No. 2,761,835 to Brown
U.S. Pat No. 2,814,593 to Beiswanger, et al.
U.S. Pat. No. 2,075,958 to Piggott
U.S. Pat. No. 2,097,640 to Piggott
U.S. Pat. No. 2,504,977 to Gump
U.S. Pat. No. 2,541,816 to Alarum, et al.
U.S. Pat. No. 2,659,693 to Lytle U.S. Pat. No. 2,738,325 to Rydell
U.S. Pat. No. 2,745,809 to Cardwell
U.S. Pat. No. 2,759,975 to Chiddex
U.S. Pat No. 2,792,400 to De Groote
U.S. Pat. No. 2,821,488 to Jeyl Preferred compounds in the present invention are those wherein Q has the structure

in which $R_4$ is an acid radical including such radicals as may be derived from branch chain and straight chain, saturated and unsaturated carboxylic aliphatic, alicyclic fatty, aromatic, hydroaromatic and aralkyl acids, such as caprylic, butyric, heptylic, caproic, capric, pimelic, sobacic, erucic and particularly saturated and unsaturated higher molecular weight aliphatic acids such as the fatty acids containing at least 12 carbon atoms and including in addition to those above-mentioned mellisic, stearic, oleic, ricinolic, linolenic, lauric, myristic, ricinostearolic, acetyricinoleic chloracetylricinoleic, linoleic, ricinoleyl lactic, dodecyclanic and palmitic acids and mixtures of any two or more of these acids or other acids such as are obtainable from animal or vegetable sources, e.g., lard, coconut oil, rapeseed oil, sesame oil, palm kernal oil, palm oil, olive oil, corn oil and cottonseed oil, preferably between 12 and 18 carbon atoms in length; and $R_1$, $R_2$ and $R_3$ are each monovalent radicals containing up to seven carbon atoms inclusive and may be alkyl, e.g., methyl, ethyl, propyl, butyl, isobutyl, pentyl, neopentyl, hexyl and heptyl; aryloxy e.g., ethoxy and propoxy; hydroxyalkyl e.g., hydroxymethyl, hydroxyethyl, hydroxybutyl; aryloxy e.g., phenoxy and methyl phenoxy and alkaryl e.g., tolyl, cresyl, cumyl and the like.

As stated above the ammonium moiety of the present compound is conventional in structure and is similarly effective biocidally with increased efficiency by virtue of the remainder of the compound molecule, the —O—Ar—NO moiety. This moiety is a nitroso aryloxy radical and may contain an Ar group which is dinuclear e.g., naphthyl or mononuclear e.g., phenyl, tolyl, ethylbenzyl, cumyl, resorcyl groups or the like having the O and NO substituents in the ortho or para arrangement. Preferred compounds have p-phenylene radicals as the AR group and contain up to two other substituents selected from hydroxy, chlorine and bromine groups and alkyl groups having from one to four carbon atoms e.g., methyl, ethyl, propyl, isopropyl, butyl and isobutyl groups.

The compound, coco dimethyl benzyl ammonium p-nitroso phenate is described and claimed in my copending application Ser. No. 659,320 filed on Aug. 9, 1967 now U.S. Pat. No. 3,551,334 and the compound per se is therefore not claimed herein.

The compounds of the present invention may be made by the reaction of a quaternary ammonium halide, prepared as described in one of the foregoing patents or otherwise, and an alkali metal ester of the aryl alcohol desired e.g. sodium phenate, separating the resultant ammonium phenate and byproduct salt and reacting with nitrous oxide gas to substitute the nitroso group onto the aromatic ring. Reaction conditions are mild throughout e.g., room temperature or slightly above and alcoholic media is conveniently used.

EXAMPLES (All parts by Weight)

A. Preparation of the Compounds 1. 2 3/10 parts of sodium metal was dissolved in 100 parts of methyl alcohol. To the solution 9.4 parts of phenol was added and on its dissolution 326 parts of coco dimethyl benzyl ammonium chloride was added. After mixing and heating for 15 minutes at 50°C. the solution was cooled to 25 °C. and filtered to separate the sodium chloride produced. The filtrate containing coco dimethyl benzyl benzyl ammonium phenoxide in alcohol solution is saturated with nitrous oxide using a sparging tube. Reaction to the nitroso phenate occurs over a 24 hour period at room temperature. The alcohol is evaporated off leaving a waxy solid, coco dimethyl benzyl ammonium p-nitroso phenoxide.

2. Examples A-1 is duplicated substituting 10.8 parts of cresol for the phenol. There is obtained a waxy solid, coco dimethyl benzyl ammonium p-nitroso cresoxide.

3. Example A-1 is duplicated utilizing dodecyl dimethyl benzyl chloride prepared from 21.3 parts of dodecyclidethyl amine and 12.65 parts of benzyl chloride in methyl alcohol solution by reflux for 24 hours. A waxy solid, dodecyl dimethyl benzyl ammonium p-nitroso phenate is obtained.

4. Example A-1 is duplicated substituting an equivalent molar amount of lauryl trimethyl ammonium chloride for the chloride used there. The product obtained is lauryl trimethyl ammonium p-nitroso phenate.

5. Example A-1 is duplicated substituting an equivalent molar amount of dodecylbenzyl isoquinolinium chloride for the ammonium chloride. The product obtained is dodecyl benzyl isoquinolinium p-nitroso phenate.

6. Examples A-2 is duplicated substituting an equivalent molar amount of myristal methyl pyrrolidinium chloride for the ammonium chloride. The product obtained is myristal methyl pyrrolidinium p-nitroso phenate.

7. Example A-1 is duplicated substituting an equivalent molar amount of lauryl ethyl pipenidinium chloride for the ammonium chloride. The product obtained is lauryl ethyl piperidinium p-nitroso phenate.

8. Example A-1 is duplicated substituting an equivalent molar amount of coco pyrrolinium for the ammonium chloride. The product obtained is coco pyrrolinium p-nitroso phenate.

9. Example A-1 is duplicated substituting an equivalent amount of stearyl dichlorobenzyl hydroxyethyl imidozolinium chloride for the ammonium chloride. The product is stearyl dichlorobenzyl hydroxyethyl imidozolinium p-nitrosophenate.

10. Example A-1 is duplicated substituting an equivalent molar amount of lauryl alpha picolinium chloride for the ammonium chloride. The product obtained is lauryl alpha picolinium p-nitroso phenate.

11. Example A-1 is duplicated substituting an equivalent amount of coco methyl morpholinium chloride for the ammonium chloride. The product obtained is coco methyl morpholinium p-nitroso phenate.

12. Example A-1 is duplicated substituting an equivalent molar amount of naphthol for the phenol. The product obtained is coco dimethyl benzyl ammonium p-nitroso naphthenate.

B. Bacteriocidal Properties.

Compounds from examples A-1 to A-12 are tested for bacteriocidal and bacterrostatic effectiveness. Results are interpreted as the lowest effective concentration (=highest dilution) being best. In each test trypticase soya bacteriological medium was placed in test tubes in 5 milliliter amounts. To a series of such tubes each compound A-1 through A-12 was added in amounts ranging from 1 to 500 parts per million (p.p.m.). The treated tubes were innoculated with various micro-organisms and allowed to incubate 24 hours at 37.5°C.

At the end of the incubation period, a reading is taken of growth or no growth, tubes showing growth are discarded. The highest dilution at which no growth occurs is the bateriostatic concentration: tubes which show no growth are subcultured into fresh media and allowed to incubate at 37.5 °C. for an additional 48 hours. Again tubes showing positive growth are discarded. The highest dilution at which no growth occurs is the bacterriocidal concentration. Results typical of each of the A-1 through A-12 compounds against various micro-organisms is given below in table I.

TABLE I

COMPOUNDS A-1 TO A-12

| Micro-organism | Bacteriostatic Concentration (p.p.m.) | Bactericidal Concentration (p.p.m.) |
| --- | --- | --- |
| Salmonella typhi | 15 | 15 |
| Escherichia coli | 1 | 1 |
| Micrococcus aureus | 2 | 2 |
| Streptococcus fecalis | <1 | <1 |
| Pseudomonas fluorescens | 1 | 1 |
| Brown Algae | 10 | 10 |
| Green Algae | 10 | 10 |

These compounds are seen to be highly effective at notably low levels, particularly against the pseudomonad micro-organisms.

C. Fungicidal Properties

The technique and materials of example B are used substituting Baborouds liquid medium for fungi as the medium. Typical results for compounds A-1 through A-12 are given in table II:

TABLE II

Compounds A-1 to A-12

| Fungus | Fungistatic Concentration (p.p.m.) | Fungicidal Concentration (p.p.m.) |
| --- | --- | --- |
| Aspergillus niger | 10 | 50 |
| Rhizopus nigrificans | 50 | 500 |
| Penicillium luteum | 10 | 10 |

D. Sewage Amelioration

The compound coco dimethyl benzyl ammonium p-nitroso phenate (A-1) is particularly effective against biological generation of hydrogen sulfide gas. Other compounds A-2 through A-12 may be expected to be similarly effective. Compound A-1 was evaluated for sewage amelioration properties by treating raw sewage (D-1), aeration tank outfall (D-2), digestion tank outfall (D-3) and clear effluent reclaim water (D-4) by adding compound (A-1) to the various samples (D-1 to D-4) to which had been added trypticose soya bacteriological media. The cultures were incubated 7 days at 37.5° C. At the end of the incubation period the cultures were examined for growth of the microbe Desulfovibrio desulfuricans and for the odor of $H_2S$ gas. Results were as follows:

D-1 —Raw sewage water sample —1.0 p.p.m. prevented the growth of Desulfovibrio desulfuricans with no hydrogen sulfide gas being produced.

D-2 —Water sample from aeration tank —1.0 p.p.m. was bacteriostatic for Desulfovibrio desulfuricans with no hydrogen sulfide gas being produced.

D-3 —Water sample from digestion tank —0.5 p.p.m. prevented growth of Desulfovibrio desulfuricans with no hydrogen sulfide gas being produced.

D-4 —Clear effluent water —0.5 p.p.m. prevented growth of Desulfovibrio desulfuricans with no hydrogen sulfide gas being produced.

It is noteworthy that aerobic digestion was continued in the presence of the bacteriocide showing a high selectivity for the undesired pseudomonad.

E. Rust Inhibition and Removal

Compounds A-1 through A-12 are tested for rust inhibiting capabilities. Each compound is diluted to concentrations between 50 and 500 p.p.m. in water and flushed through rusted iron pipe several times with dwell times ranging up to several hours. Rust removal is effected in each instance, with those compounds having detergentlike radicals, e.g., Compound A-1, showing excellent results due to more efficient loosening of adherent scaler rust. Comparative tests for rust inhibition are also carried out with the result of no corrosion in the case of water standing in the pipe section with dissolved amounts Compounds A-1 to A-12 between 50 and 500 p.p.m. after several months and quite apparent rust in ordinary water-containing pipe sections. It is believed the present compounds may effectively compete for oxidizers in the water e.g., dissolved oxygen converting the nitroso group by oxidation to $NO_2$ which of course is a known rust inhibitor in the $NaNO_2$ form.

F. Secondary Oil Recovery

It will be evident that in combining the properties of rust inhibition and suppression of $H_2S$ generation the present compounds are ideal additives for brine or other aqueous fluid used to recover additional oil from wells following conventional drilling extraction. This process is well known as the use of various antibacterial and anticorrosive additives, particularly in sour gas fields such as those in Texas. See for example U.S. Pat. No. 2,733,206 to Prusick and U.S. Pat. No. 2,472,400 to Bond, et al.

Testing of compounds A-2 through A-12 shows that $H_2S$ generation is suppressed as the reducing state of the oil-brine mixture is lessened by reductive conversion of the —NO group to $NH_2$ and the Desulfovibrio desulfricans are accordingly destroyed and produce no $H_2S$. Simultaneously the NO group at surfaces subject to oxidative attack from dissolved oxygen in the recovery fluid are protected by the preferential oxidation of the —NO group to —$NO_2$.

In addition slime formation is prevented and fouling of lines, pumps and filters is materially reduced. Use concentrations will range between 0.5 and 1,000 p.p.m. or higher up to 10,000 p.p.m. for secondary oil recovery solutions.

G. Surface Fungicide

The compounds A-1 through A-12 are incorporated in various hydraulic materials such as concrete and plaster in concentrations up to 1,000 p.p.m. Growth of fungi is inhibited at the surfaces of the formed material. Similarly coating material such as water latex paints may be treated to resist fungi by incorporation of 50 to 1,500 p.p.m. of one of the present compounds.

H. Detergency

As mentioned hereinabove, those compounds containing fatty acid radicals of known detergent utility retain this property in their present structures so that lard or grease may be effectively removed during biocidal use of these compounds, suggesting use of these compounds as disinfecting additives for cleaning materials, e.g., at concentrations of 1 to 25 percent by weight.

I. Controls

1. Coco dimethyl benzyl ammonium chloride was tested in the B test series above. Bacteriostatic and bacteriocidal levels were above 100 p.p.m. demonstrating the advantage conferred by addition of the nitrosophenate moiety with the quaternary ammonium moiety.

2. Nitrosophenol was tested in the B test series above. Bacteriostatic and bacteriocidal levels were not measurable in the test series, demonstrating the surpressing nature of biocidal improvement by virtue of addition of a nitrosophenoxy radical to a quaternary ammonium compound.

I claim:

1. Method of combatting algal, bacterial or fungal micro-organisms which comprises contacting said micro-organisms with an effective amount of a compound selected from the group consisting of
    coco dimethyl benzyl ammonium p-nitroso phenoxide;
    coco dimethyl benzyl ammonium p-nitroso cresoxide;
    dodecyl dimethyl benzyl ammonium p-nitroso phenate;
    dodecyl benzyl isoquinolinium p-nitroso phenate;
    myristyl methyl pyrrolidinium p-nitroso phenate;
    lauryl ethyl piperdinium p-nitroso phenate;
    4-stearyl dichlorobenzyl hydroxyethyl imadozolinium p-nitroso phenate;

lauryl alpha picolinium p-nitroso phenate;
coco methyl morpholinium p-nitroso phenate; and
coco dimethyl benzyl ammonium p-nitroso naphthenate 2. Method according to claim 1 in which said micro-organisms are in a liquid and said compound is added to said liquid at the rate of 0.05 to 1,000 parts per million parts by weight of the liquid.

3. Method according to claim 1 in which said liquid is aqueous.

4. Method according to claim 1 wherein the micro-organisms are in sewage and the effective amount of said compound is a concentration level which inhibits therein bacteriological generation of hydrogen sulfide gas.

5. Method according to claim 4 in which said compound is coco dimethyl benzyl ammonium nitroso phenate.

6. Method according to claim 1 in which said micro-organisms are in oil and normally tend to generate hydrogen sulfide gas and the compound is added in a sufficient amount to inhibit bacteriological generation of said gas.

* * * * *